July 27, 1926.
E. N. MINCER
SANITARY SERVING FORK
Filed Dec. 22, 1924
1,594,314
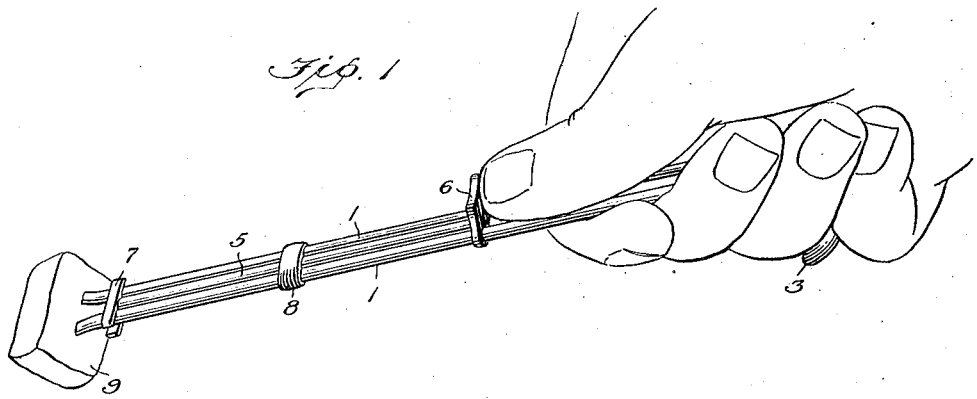
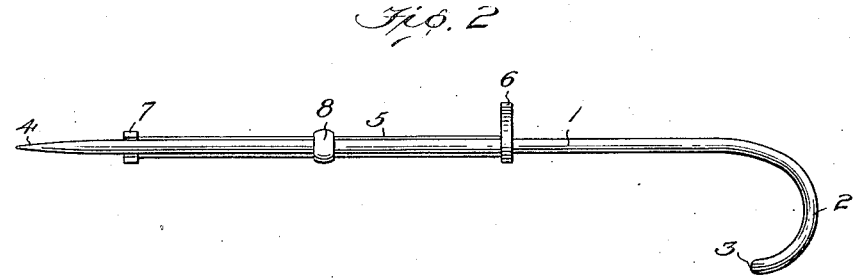
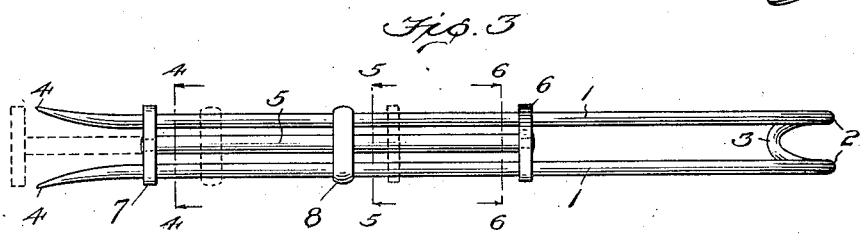
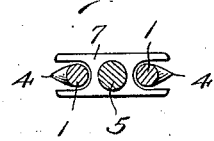 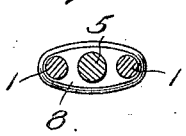 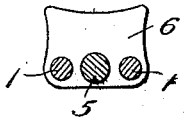
Witness
Edwin L Bradford
Inventor
Edwin N. Mincer,
By Wm E Dyre
His Attorney Patented July 27, 1926.

1,594,314

UNITED STATES PATENT OFFICE.

EDWIN N. MINCER, OF CHICAGO, ILLINOIS.

SANITARY SERVING FORK.

Application filed December 22, 1924. Serial No. 757,555.

My present invention relates to cutlery, but more particularly stated to certain improvements in sanitary serving forks.

It has for an object the production of implements of the character indicated, for table or kitchen uses, by agency whereof articles of food may be speedily served without coming in contact with hands of the server.

It has for a further object the production of forks possessing the qualities aforesaid, which in addition are of extremely simple construction, comparatively inexpensive to manufacture, light in weight, attractive in appearance, and easily kept clean.

With the foregoing and other objects in view the invention will now be particularly described, and then pointed out by the claims following.

In the accompanying drawings which form part of this application for Letters Patent, and whereon corresponding numerals refer to like parts in the several illustrations:

Figure 1 is a perspective view of the complete invention in service, showing a pad of butter, by way of exemplification, in process of being served or discharged from the fork tines;

Figure 2 is a side elevation of the invention;

Figure 3 is a top plan view of same, showing in dotted lines, the pusher bar projected;

Figure 4 is a transverse sectional view through the structure, taken upon the line 4—4 of Figure 3, looking in the direction indicated by arrows;

Figure 5 is a sectional view corresponding with Figure 4 but upon the lines 5—5 of Figure 3; and Figure 6 is also a sectional view through the same Figure 3, on the line 6—6 thereof.

Reference being had to the drawings and numerals thereon, 1, 1 indicates the fork body, preferably of skeleton form made of one continuous piece of metal wire of suitable gauge, looped or doubled upon itself as at 2 to form a terminal hook 3, and thence continuing in parallellism to its oppositely diverging pointed tines 4, 4.

Intermediate the two body or fork members 1, 1, aforesaid, is positioned a longitudinally movable straight pusher-bar 5, also by preference made of wire. To the upper end of this bar 5 is riveted a projecting thumb piece 6 adapted to run freely upon the parallel rods 1, 1, of the fork body both of which rods pass loosely through apertures formed for that purpose at the sides of said thumb-piece 6.

At its opposite or advance end the bar 5 is further provided with a pusher or food ejector 7 secured thereto rigidly as by riveting, and provided with a transverse open slot in each end arranged and adapted to slidingly receive and loosely embrace its respective fork members 1, 1, and to freely permit passage of said pusher or ejector beyond the end of the diverging fork tines 4, 4, as will later appear.

At a point intermediate the thumb-piece 6 and pusher or food ejector 7 aforesaid, the reciprocating pusher-bar 5 is rigidly secured to a bridge 8 perforated at its ends, and running freely upon the body fork members 1, 1, which in turn pass through the said perforations.

The operation and use of my invention may be briefly set forth as follows:

An article of food, as for example a square of butter 9, as illustrated, having been empaled upon the fork tines 4, 4, when the pusher bar or ejector 7 is yet retracted in the position shown by full lines in Figure 3, may then be conveyed to its point or place of serving.

With parts in the relative position indicated by Figure 1, the thumb of an operator is then employed to advance the pusher bar 5 and its ejector 7, by means of pressure applied to the thumb piece 6 as illustrated.

During this operation the movable parts are advanced from the position shown by full lines to that shown by dotted lines in Figure 3 of the drawings, the article 9 being thus ejected or served, and it will be particularly noted that such movement of the ejector 7 over the flaring or outwardly diverging fork tines 4, 4, is permitted by reason of the slotted ends of said ejector, as distinguished from the simple perforations of the bridge 8 and thumb piece 6, both of which are also slidable upon the fork members 1, 1.

The foregoing being a description of my invention in one desirable form of embodiment, it should be understood that various structural changes may be made, and various substitutions resorted to without in the least departing from the spirit of my invention as hereinafter claimed. The form of fork illustrated contemplates the use of wire of suitable gauge and material, because of its ease and economy of manufacture, but obviously the device is by no means so limited, and may be constructed in whole or in part of metal, and may then be variously finished as by plating or other means of ornamentation.

The hooked extremity 3 affords an especially convenient means for holding the fork when in actual use as illustrated by Figure 1, and moreover, when not in use, this same hook 3 presents an equally satisfactory means for suspending the device in a kitchen cupboard, or elsewhere until needed.

Having thus described my invention what I now claim and desire to secure by Letters Patent is:

In a sanitary serving fork, the combination with parallel fork members of unitary construction connected at their outer ends to form a terminal hook of outwardly diverging fork tines at the opposite ends of said members, a food ejector reciprocally mounted upon said fork tines by means of open slots in its opposite ends through which said tines freely pass, a pusher rod connected with said extractor and arranged between the parallel fork members aforesaid, a slidable member connecting the rod and fork members, and a thumb piece fixed to the outer end of the rod and having apertures through which the fork members loosely extend.

In testimony whereof I affix my signature.

EDWIN N. MINCER.